United States Patent [19]

Tamura et al.

[11] Patent Number: 4,539,393
[45] Date of Patent: Sep. 3, 1985

[54] DIMENSIONALLY STABLE POLY-M-PHENYLENE ISOPHTHALAMIDE FILM

[75] Inventors: Yorikazu Tamura; Jiro Sadanobu, both of Iwakuni; Tsutomu Nakamura, Yamaguchi, all of Japan

[73] Assignee: Teijin Limited, Osaka, Japan

[21] Appl. No.: 482,241

[22] Filed: Apr. 5, 1983

[30] Foreign Application Priority Data

Apr. 13, 1982 [JP] Japan ................................. 57-60293
May 28, 1982 [JP] Japan ................................. 57-89848
Jun. 7, 1982 [JP] Japan ................................. 57-96265
Dec. 14, 1982 [JP] Japan ................................. 57-217691

[51] Int. Cl.$^3$ ............................................. C08G 69/32
[52] U.S. Cl. ..................................... 528/348; 528/183; 528/337; 528/338; 528/339; 528/340; 528/344
[58] Field of Search ............... 528/348, 337, 338, 339, 528/340, 344, 183

[56] References Cited

U.S. PATENT DOCUMENTS 3,287,324 11/1966 Sweeny ................................ 528/348
4,346,215 8/1982 Garlington et al. ............... 528/348

Primary Examiner—Harold D. Anderson
Attorney, Agent, or Firm—Kenyon & Kenyon

[57] ABSTRACT

A process for producing an aromatic polyamide film, which comprises drawing an undrawn aromatic polyamide film biaxially at a draw ratio of at least 1.5 in a solvent mixture consisting of (a) 5% to 75% by weight of a good solvent of the aromatic polyamide and (b) 25% to 95% by weight of a non-solvent of the aromatic polyamide, and heat treating the drawn film, which contains at least 1% by weight, based on the weight of the film, of a good solvent of said aromatic polyamide, at a temperature of not lower than 150° C.

An m-phenyleneisophthalamide polymer film having extremely excellent dimensional stability under moist conditions, which film has a density d of from 1.35 to 1.41 g/cm$^3$ and principal refractive indices $n_\alpha$, $n_\beta$ and $n_\gamma$ ($n_\alpha > n_\beta > n_\gamma$) for D-line of a wavelength of 589 nm satisfying the following formula:

$$\frac{n_\alpha + n_\beta}{2} - n_\gamma \geq 0.05.$$

5 Claims, No Drawings

DIMENSIONALLY STABLE POLY-M-PHENYLENE ISOPHTHALAMIDE FILM

BACKGROUND OF THE INVENTION

1. Field of the Invention

The present invention relates to a process for producing an aromatic polyamide film excellent in mechanical properties, dimensional stability, and electrical properties. The present invention further relates to an m-phenyleneisophthalamide polymer film having a highly improved dimensional stability under moist conditions.

2. Description of the Prior Art

Aromatic polyamides have excellent thermal properties and mechanical properties. Especially, aromatic polyamides such as p-phenyleneterephthalamide polymers, halogen-substituted p-phenyleneterephthalamide polymers, p-phenyleneisophthalamide polymers, and m-phenyleneisophthalamide polymers are broadly utilized as a material for producing fiber, paper, and the like. However, in spite of the excellent heat resistance and mechanical properties of the aromatic polyamides, aromatic polyamide articles such as films or sheets are inferior to polyimide articles in hygroscopicity and dimensional stability, particularly moisture absorption dimensional stability. Particularly, conventional aromatic polyamide films do not always have satisfactorily high performance, and thus, it has been strongly desired to provide an aromatic polyamide film having improved properties.

For the purpose of attaining the above-mentioned desire, there have been proposed methods in which an m-phenyleneisophthalamide polymer film is treated with a long chain fatty acid, fluorinated or chlorinated aliphatic carboxylic acid, or methyl radical-containing aromatic hydrocarbon; a halogenated aromatic hydrocarbon is incorporated into an m-phenyleneisophthalamide polymer film; or a silicone polymer or fluoropolymer is coated onto the surface of an m-phenyleneisophthalamide polymer film, in Japanese Unexamined Patent Publication (Kokai) Nos. 51-122160, 51-122173, 51-122174, 52-41899, and 52-41900. Also, Japanese Unexamined Patent Publication (Kokai) Nos. 52-56169 and 52-152973 disclose a method for improving the electrical properties of an m-phenyleneisophthalamide polymer film by drawing it biaxially. Further, Japanese Examined Patent Publication (Kokoku) No. 53-45238 discloses a method in which a halogen-substituted p-phenyleneterephthalamide polymer film is heat treated under tension to reduce the hygroscopicity of the film and to improve the electrical properties of the film.

Each of these methods is fairly effective for improving the properties of the aromatic polyamide film. However, these methods can not attain the drastic improvement in the hygroscopicity of an aromatic polyamide owing to the polar amide groups thereof, and thus, the resultant films do not have satisfactorily high performace, having unsatisfactorily improvement in dimensional stability, particularly moisture absorption dimensional stability, and in electrical properties.

SUMMARY OF THE INVENTION

In view of the above-mentioned problems in conventional aromatic polyamide films, the inventors have made extensive studies for reducing the hygroscopicity and enhancing the dimensional stability, especially moisture absorption dimensional, of an aromatic polyamide film, without deleteriously affecting the excellent mechanical, thermal, and electrical properties inherent thereto, and have attained the present invention from the results of the studies.

The present invention provides a process for producing an aromatic polyamide film, which comprises drawing an undrawn aromatic polyamide film biaxially at a draw ratio of at least 1.5 in a solvent mixture consisting of (a) 5% to 75% by weight of a good solvent of said aromatic polyamide and (b) 95% to 25% by weight of a non-solvent of said aromatic polyamide, and heat treating the drawn film, which contains at least 1% by weight, based on the weight of the film, of a good solvent of said aromatic polyamide, at a temperature of not lower than 100° C.

The aromatic polyamide film obtained by the above-mentioned process of the present invention possesses highly improved mechanical properties, moisture absorption dimensional stability, and electrical properties.

The present inventors have further made studies and unexpectedly found that an m-phenyleneisophthalamide polymer film having a high degree of crystallinity and a high degree of biaxial molecular orientation possesses notably excellent dimensional stability under moist conditions.

Thus, the present invention further provides an m-phenyleneisophthalamide polymer film having a density d of from 1.35 to 1.41 g/cm$^3$ and principal refractive indices $n\alpha$, $n\beta$, and $n\alpha$ ($n\alpha > n\beta > n\gamma$) for D-line of a wavelength of 589 nm satisfying the following formula:

$$\frac{n\alpha + n\beta}{2} - n_\gamma \geq 0.05$$

DESCRIPTION OF THE PREFERRED EMBODIMENTS

The "good solvent" as used herein refers to a solvent which dissolves the aromatic polyamide constituting the undrawn aromatic polyamide film in an amount of not less than 0.5 g per 100 ml.

The aromatic polyamides usable for the present invention include aromatic polyamide polymers containing recurring units selected from the group formulae:

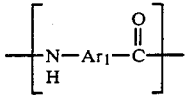

and

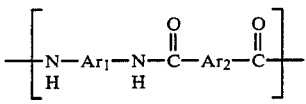

in which $Ar_1$ and $Ar_2$ may be the same or different and each independently represents a divalent aromatic radical. The aromatic polyamide polymers may contain the above-mentioned recurring units alone or may contain other copolymerized units. In the case where the aromatic polyamide polymers contain other copolymerized units, it is preferable that they contain at least 50 mol % of the above-mentioned recurring units.

The representative examples of the divalent aromatic radical as $Ar_1$ or $Ar_2$ include those having the following structural formulae:

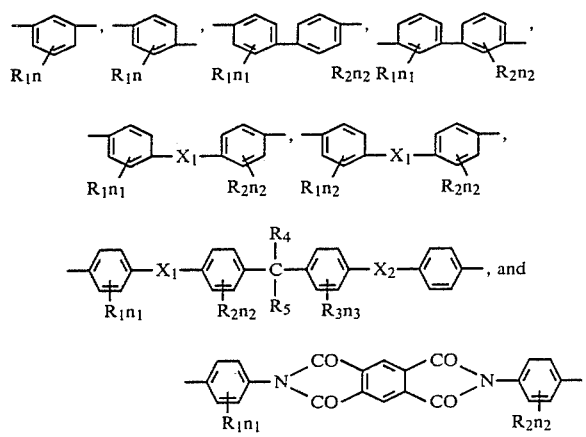

in which each of $R_1$, $R_2$, $R_3$, $R_4$ and $R_5$ independently represents a lower alkyl, lower alkoxy, halogen or nitro group, each of $n_1$, $n_2$ and $n_3$ independently represents an integer of 0, 1, 2, 3, or 4, and each of $X_1$ and $X_2$ independently represents one member selected from

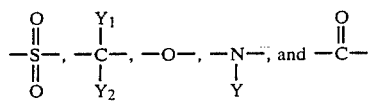

in which Y, $Y_1$, and $Y_2$ each independently represents a hydrogen atom or a lower alkyl group.

The representative examples of the aromatic polyamide polymers usable for the present invention include poly-m-phenyleneisophthamide and copolymers thereof, poly-m-phenyleneterephthalamide and copolymers thereof, poly-p-phenyleneterephthalamide and copolymers thereof, poly-p-benzamide and copolymers thereof, poly-3,4'-diphenyl-ether-terephthalamide and copolymers thereof, and a polyamide obtained from 2,2-bis-[4-(4-aminophenoxy)-phenyl]-propane and isophthaloyl chloride and copolymers thereof. However, the aromatic polyamide polymers are not limited to these polymers.

The aromatic polyamide polymers may be prepared by the solution polymerization or interfacial polymerization of an aromatic dicarboxylic acid halide with an aromatic diamine.

The undrawn aromatic polyamide film usable for the present invention includes films prepared by a conventional film forming process such as dry process, wet process, or semidry-semiwet process, from a polymer solution of an aromatic polyamide polymer as mentioned above in an amide solvent such as dimethylformamide, dimethylacetamide, or N-methyl-2-pyrrolidone which may optionally contain a metal halide such as calcium chloride, lithium chloride, magnesium chloride, lithium bromide, calcium bromide, or ammonium bromide, or a polymer solution of an aromatic polyamide polymer in dimethyl sulfoxide or concentrated sulfuric acid.

The undrawn aromatic polyamide film prepared by an appropriate film forming process is then subjected to biaxial drawing at a draw ratio of at least 1.5 in a solvent mixture having the following composition.

That is to say, in the process of the present invention, there is employed, as a drawing bath, a solvent mixture consisting of (a) 5% to 75% by weight of a good solvent of the aromatic polyamide and (b) 25% to 95% by weight of non-solvent of the aromatic polyamide, the total of the solvent (a) and solvent (b) being 100% by weight.

The good solvent (a) must be a solvent which can dissolve the employed aromatic polyamide in an amount of at least 0.5 g per 100 ml. If the solvent dissolves only a smaller amount of the polyamide, the desired effects of the present invention can not be attained.

Examples of the good solvent of the aromatic polyamide include amide solvents such as tetramethylurea, N,N-dimethylacetamide, N-methyl-2-pyrrolidone, N-methylpiperidone, N,N-dimethylethyleneurea, N,N,N',N'-tetramethylmalonic acid amide, N-methylcaprolactam, N-acetylpyrrolidine, N,N-diethylacetamide, N-ethylpyrrolidone, N,N-dimethylpropionic acid amide, N,N-dimethylisobutylamide, N,N-dimethylpropyleneurea, and N,N-dimethylformamide, as well as dimethylsulfoxide. The good solvent may optionally contain a metal halide such as lithium chloride, calcium chloride, lithium bromide, or calcium bromide.

The typical examples of the non-solvent (b) of the aromatic polyamide include water, ethylene glycol, propylene glycol, polyethylene glycol, methylene chloride, and ethylene chloride. Any other solvents may be employed so far as they are compatible with the good solvent (a) and non-solvent for the aromatic polyamide. However, water is the most advantageous solvent (b) from the industrial view point.

If the amount of the good solvent (a) present in the solvent mixture is less than 5% by weight, the solvent action of the solvent mixture is not satisfactory so that the desired effects of the present invention may not satisfactorily be attained. On the other hand, if the amount of the good solvent (a) is more than 75% by weight, the solvent action of the solvent mixture on the aromatic polyamide film is too strong so that the desired effects of the molecular orientation by the drawing may not be attained. Preferably, the solvent mixture contains 10% to 60% by weight of the good solvent (a) and 40% to 90% by weight of the non-solvent (b).

The drawing temperature may vary from room temperature to the boiling point of the solvent mixture depending on the type of the used aromatic polyamide and the type and mixed amount of the good solvent (a). However, in general, a drawing temperature of from 40° C. to 100° C. may advantageously be employed.

Further, the drawing must be effected biaxially. If the drawing is carried out one direction only, the resultant film may have anisotropy in the mechanical properties as well as poor dimensional stability, particularly poor moisture absorption dimensional stability. The biaxial drawing may be effected concurrently or successively.

The biaxial drawing should be effected at a draw ratio of at least 1.5, respectively in the both directions. If the draw ratio is less than 1.5, the resultant film may have poor dimensional stability. The upper limit of the draw ratio is not critical and a draw ratio as high as possible may be preferred. However, it is preferable, from the view point of stable operation, that the drawing be carried out at a draw ratio corresponding to 70% to 80% of the possible highest draw ratio. The proportions of the respective ratios in the both direction may depend on the type of the used aromatic polyamide, the composition of the drawing bath and/or the condition of the undrawn film and may be decided according to the desired balance of the mechanical properties of the respective direction and the desired performance of the resultant film.

The undrawn aromatic polyamide film prepared by the dry process, wet process, or semidry-semiwet process as mentioned hereinbefore may be subjected to the biaxial drawing in the solvent mixture in the dry state, or wet state containing water or water and the good solvent. However, the wet film is easy to handle and thus preferred.

The biaxially oriented film is then subjected to heat treatment according to the process of the present invention. The biaxially oriented film is caused to contain at least 1% by weight, based on the weight of the film, of a good solvent, and then, the film containing the good solvent is heat treated at a temperature of not lower than 150° C. Any of the good solvents as mentioned hereinbefore as being usable for the drawing may also be used for the heat treatment. The good solvent to be used for the heat treatment may be the same as or different from, but preferably the same as, the good solvent used in the drawing bath. Among the hereinbefore-mentioned good solvents, N,N-dimethyl-acetamide and N-methyl-2-pyrrolidone are particularly preferred. Preferably, the drawn aromatic polyamide film to be heat treated contains not less than 5% by weight of a good solvent. The upper limit of the good solvent content is not critical, but in general, it is preferable that the film contain the good solvent in an amount of not more than 100%, particularly not more than 70% by weight. If the film contains only less than 1% by weight of the good solvent, the desired effects of the present invention may not be attained. In the case where the film contains too large an amount of the good solvent, the molecular orientation of the film may disadvantageously be degraded so that the desired performance of the film can not be attained.

Preferably, the heat treatment is carried out at a temperature of not lower than 200° C., more preferably not lower than 250° C., but lower than the melting point or decomposition point of the used aromatic polyamide. The heat treatment may be effected while keeping the dimensions of the film the same as the original ones or while keeping the film under tension or relaxation. The heat treatment may be carried out on a heated roller or plate, but may suitably be carried out in a heated gaseous atmosphere. Further, the heat treatment may be carried out at two or more stages. For example, the heat treatment may be carried out at two stages, in which the film is heated while keeping the dimensions of the film unchanged or keeping the film under tension at the first stage, and the film is heated under relaxation at the second stage.

The drawn aromatic polyamide film may be caused to contain a good solvent by washing the film biaxially drawn in the solvent mixture with water and, then, with or without drying the film, immersing the film in a mixture of the good solvent and a non-solvent, especially water, or spraying such a mixture onto the film. Further, the film may be caused to contain a good solvent by removing the non-solvent from the solvent mixture used in the biaxial drawing and retained in the drawn film, so that a certain amount of the good solvent is retained in the film. This method is preferred, since the biaxial drawing and the heat treatment may continuously be carried out.

It has further been found that an aromatic polyamide film having further improved moisture absorption dimensional stability, electrical properties and mechanical properties can be obtained by using as the starting undrawn aromatic polyamide film in the process of the present invention an undrawn aromatic polyamide film prepared by a wet film-forming process in which an aromatic polyamide composition consisting of an aromatic polyamide, an amide solvent and a solubilizing agent and having a composition represented by the following formulae is introduced into an aqueous coagulating bath:

$$0.5 \geq \frac{x}{x+y} \geq 0.05 \quad (1)$$

$$\frac{z}{x} \geq 0.1 \quad (2)$$

in which x represents the parts by weight of the aromatic polyamide, y represents the parts by weight of the amide solvent, and z represents the parts by weight of the solubilizing agent.

Examples of the amide solvent include those as mentioned hereinbefore as being usable for the good solvent (a). Preferred amide solvents include N-methyl-2-pyrrolidone, N,N-dimethylacetamide, and a mixture thereof.

Examples of the solubilizing agents include salts of metals belonging to the groups I and II of the periodic table and ammonium halide. These salts exist in the dissolved state in the polymer composition and act to enhance the stability of the solution, as described in Japanese Examined Patent Publication (Kokoku) No. 35-16027. Preferred examples of the solubilizing agent are lithium chloride, calcium chloride, and magnesium chloride, especially calcium chloride.

In the case of $$\frac{x}{x+y} < 0.05,$$

the aromatic polyamide composition may not have satisfactory film-forming properties. In the case of $$\frac{x}{x+y} > 0.5,$$

the aromatic polyamide composition may have too high a viscosity. Further, in the case of $z/x < 0.1$, the aromatic polyamide composition may not have satisfactory stability.

In the case where an aromatic polyamide containing at least 75 mol % of m-phenyleneisophthalamide units is employed, the aromatic polyamide composition preferably has the following composition: either $$0.25 \leq \frac{x}{x+y} \leq 0.336$$

and $0.1 \leq \frac{z}{x}$ or $0.336 \frac{x}{x+y} \leq 0.5$

-continued and $2.8 \times \frac{x}{x+y} - 0.18 < \frac{z}{x}$

Typically, the aromatic polyamide composition may be prepared by a redissolving process or a solution polymerization-neutralization process.

In the redissolving process, proper proportions of an m-phenyleneisophthalamide polymer, amide solvent, and solubilizing agent are blended and dissolved together. In a typical procedure, the solubilizing agent is first dissolved into the amide solvent, and then, the polymer is admixed and dissolved into the solution, preferably while cooling. Although the solubilizing agent may not be dissolved completely in the amide solvent depending on the type or amount of the used solubilizing agent, it may often be uniformly dissolved after the addition of the polymer. Alternatively, a powder of the solubilizing agent and a powder of the polymer may be well blended together, optionally by grinding further, and thereafter, the amide solvent may be added to the blend while cooling.

The aromatic polyamide composition may also be prepared by a solution polymerization-neutralization process as disclosed, for example, in Japanese Examined Patent Publication (Kokoku) No. 35-14399.

If desirable, the following additives or modifiers may be added to the aromatic polyamide composition: for example, light stabilizers, heat stabilizers, anti-oxidants, crosslinking agents, flame-retardants, UN-screening agents, antistatic agents, flatting agents, colorants such as dyes and pigments, organic or inorganic fillers or reinforcements, plasticizers, and viscosity modifiers.

As the wet film-forming process, there may be employed the following two methods. One is a wet forming method in which a film is formed by introducing the polymer composition directly into a coagulating bath. The other is a dry extrusion-wet forming method in which the polymer composition is extruded into a gaseous medium such as air, steam, or nitrogen at room temperature and the extrudate is run in the gaseous medium over a distance of 1 to 60 cm for about 1 to 70 seconds and then introduced into a coagulating bath.

As the coagulating bath usable for the film formation from the aromatic polyamide composition, there may be employed an aqueous inorganic salt solution, an aqueous organic solvent solution, and a mixture thereof.

Typical examples of the inorganic salt usable for the aqueous inorganic salt solution include $CaCl_2$, $BaCl_2$, $ZnCl_2$, $MgCl_2$, NaCl, KCl, $AlCl_3$, $SnCl_2$, $NiCl_2$, $SrCl_2$, LiCl, $CaBr_2$, LiBrCa $(NO_3)_2$, Zn $(NO_3)_2$, Al $(NO_3)_2$, Ca $(SCN)_2$, KSCN, and NaSCN. Preferred inorganic salts are LiCl, $CaCl_2$, $MgCl_2$, and $ZnCl_2$, especially LiCl and $CaCl_2$. In general, it is preferable to use an inorganic salt the same as that used as the solubilizing agent in the aromatic polyamide composition.

The suitable concentration of the inorganic salt in the aqueous solution may vary depending on the type of the inorganic salt, the composition of the polymer composition, or the film-forming conditions. However, an aqueous solution containing not less than 20% by weight of an inorganic salt is generally preferred. Using such a coagulating bath, there can be obtained a film excellent in mechanical properties and transparency. Although the composition and temperature of the coagulating bath and the immersion time may vary depending on the desired thickness or transparency of the resultant film, the suitable temperature of the coagulating bath may generally be 40° to 110° C. in the case of the use of an aqueous inorganic salt solution.

As the organic solvent usable for the coagulating bath, there may be employed various alcohols as well as amide solvents. Among the alcohols, alkylene glycols are preferably used as the organic solvent. Typical alkylene glycols include ethylene glycol, propylene glycol, polyethlene glycol, and polypropylene glycol. The concentration of the aqueous polyalkylene glycol or glycerin solution may vary depending on the composition of the aromatic polyamide composition and the type and conditions of the film-forming process, but an aqueous solution of a concentration of not less than 30% by weight may generally be employed. The temperature of the coagulating bath of an aqueous organic solvent solution may be selected from temperatures of from 30° C. to the boiling point of the coagulating bath.

In a preferred embodiment of the present invention, a multi-stage coagulating bath may often be employed. Although various combinations of coagulating systems such as consisting of aqueous inorganic salt solution systems of different concentrations or temperatures or systems of different compositions may be employed in the multi-stage coagulating bath, a multi-stage coagulating bath consisting of a combination of coagulating systems of the same type is preferred from the industrial view point. The film thus formed may then be washed with water to remove the organic solvent or inorganic salt, thereby producing a uniform, transparent, wet film of a water content of not less than 40% by weight, usually of 80% to 200% by weight.

To the aromatic polyamide film as mentioned above, there may optionally be added a cross-linking compound or silicone compound and the film may optionally be irradiated with ultraviolet rays or electron beams. The film may further contain dyes, pigments, fillers, and other inorganic fillers and inorganic materials.

Typical examples of the cross-linking compound include triallyl cyanurate, diallyl methyl cyanurate, polyethylene allyl cyanurate, triallyl isocyanurate, diallyl methyl isocyanurate, polyethylene allyl cyanurate, ethylene-bis-(diallyl-cyanurate), tetramethylene-bis-(diallyl-cyanurate), ethylene-bis-(diallyl-isocyanurate), tetramethylene-bis-(diallyl-isocyanurate), diallyl hydroxyethyl cyanurate, diallyl hydroxyethyl isocyanurate, diallyl carboethoxy cyanurate, diallyl carboethoxy isocyanurate, diallyl chloroethyl cyanurate, and diallyl chloroethyl isocyanurate.

Typical examples of the silicone compound include methyl silicone oil, phenyl-modified silicone oil, aminemodified silicone oil, vinyl-triethoxysilane, vinyl-tris-(2-methoxyethoxy)-silane, γ-methacryloxypropyl trimethoxy silane, N-β-(aminoethyl)-γ-aminopropyl trimethoxy silane, β-(3,4-epoxycyclohexyl)-ethyl trimethoxy silane, γ-glycidoxypropyl trimethoxy silane, and γ-mercaptopropyl trimethoxy silane.

The aromatic polyamide film thus prepared, by the process according to the present invention has thermal resistance and dimensional stability substantially the same as or superior to those of polyimide films and, in addition, mechanical properties much superior to those of polyimide films. Thus, the film can be used as an electrical insulating material and for electronic parts such as flexible print circuits.

The present invention further provides an m-phenyleneisophthalamide polymer film having excellent electrical and mechanical properties as well as remarkably excellent dimensional stability. The film has a density d of from 1.35 to 1.41 g/cm³ and principal refractive indices nα, nβ and nγ (nα>nγ>nγ) for D-line of a wavelength of 589 nm satisfying the following formula:

$$\frac{n\alpha + N\beta}{2} - n\gamma \geq 0.05$$

The m-phenyleneisophthalamide polymer includes m-phenyleneisophthalamide polymers, at least 95 mol % of which consists of m-phenyleneisophthalamide units formed by the solution polymerization or interfacial polymerization of m-phenylenediamine with an isophthalic acid halide such as isophthaloyl chloride. Thus, the m-phenyleneisophthalamide polymer may contain less than 5 mol % of copolymerized units. Examples of the copolymerizable amine component include p-phenylenediamine, benzidine, 4,4'-diaminodiphenyl ether, 3,4'-diaminodiphenyl ether, xylylenediamine, toluenediamine, and 4,4'-diaminodiphenylsulfone, while examples of the copolymerizable acid component include dicarboxylic acid halides such as terephthaloyl chloride, 1,4-naphthalenedicarboxylic acid chloride, 2,6-naphthalenedicarboxylic acid chloride, diphenylsulfone-4,4'-dicarboxylic acid chloride, and 4,4'-diphenyldicarboxylic acid chloride.

The m-phenyleneisophthalamide polymer film having the density and refractive indices as defined above is extremely excellent in dimensional stability under moist conditions and can advantageously be utilized in the field which requires high thermal resistance and dimensional stability. For example, in order that an m-phenyleneisophthalamide polymer film be utilized as a material for the production of electronic substrates such as flexible print circuits, the film should have a moisture absorption dimensional variation at 65% R.H. of not more than 1%, preferably not more than 0.6%. In this connection, the m-phenyleneisophthalamide polymer film according to the present invention can have such a low moisture absorption dimensional variation and, thus, may advantageously be utilized as a material for the production of electronic substrates. The moisture absorption dimensional variation at 65% R.H. may be defined as follows. Moisture absorption dimensional variation at 65% R.H.

$$(\%) = \left( \frac{\text{Dimensions of film conditioned at } 25° \text{ C., } 65\% \text{ R.H.}}{\text{Dimensions of absolute dry film at } 25° \text{ C.}} - 1 \right) \times 100$$

In the film, the density d should satisfy the following relationship:

$$1.35 \leq d \leq 1.41 \quad (I)$$

The density d as defined above is one of the indications of the degree of crystallinity of the film. If the density is less than 1.35 g/cm³, the film may not have a degree of crystallinity sufficient to have a low moisture absorption dimensional variation as mentioned above. If the density is more than 1.41 g/cm³, the film may have poor flexibility. The density of the film may be measured by the density gradient tube method of a carbon tetrachloride-heptane system.

The film has principal refractive indices nα, nβ and nγ in which nα>nβ>nγ, the three axes fall at right angles to each other, for D-line of a wavelength of 589 nm satisfying the following formula:

$$\frac{n\alpha + n\beta}{2} - n\gamma \geq 0.05 \quad (II)$$

The relationship of the principal refractive indices represented by the above formula defines the biaxial molecular orientation of the film and indicates the anisotropy and degree of molecular chain tautness of the film. Preferably, the principal refractive indices of the film further satisfy the following relationship:

$$n\alpha - n\beta \leq 0.08 \quad (III)$$

The refractive indices of the film may be measured using an Abbe refractometer or a polarizing microscope provided with a universal stage.

If the $$\left( \frac{n\alpha + n\beta}{2} - n\gamma \right)$$

value is less than 0.05, the film can not have a desired high moisture absorption dimensional stability. Preferably, the $$\left( \frac{n\alpha + n\beta}{2} - n\gamma \right)$$

value is not less than 0.07.

In the m-phenyleneisophthalamide polymer film, as obtained by a process as mentioned hereinafter, the optical elastic axes corresponding to nα and nβ exist within the film area substantially without exception, and in the case where the formulae (I) and (II) are both satisfied, the film can have a moisture absorption dimensional variation at 65% R.H. of not more than 0.6% in the dimensional change within the film area. It is preferable that the film have a low anisotropic or well balanced area dimensional variation under moist conditions. If the condition (III) that $0.08 \geq (n\alpha - n\beta)$ is also satisfied, the m-phenyleneisophthalamide polymer film can have a difference of not more than 0.5 between the maximum value and the minimum value in the moisture absorption dimensional variation at 65% R.H. in the all directions in the film area. The $(n\alpha - n\beta)$ value may optionally be changed by changing the proportions of the biaxial drawing.

Typically, the m-phenyleneisophthalamide polymer film may be prepared by a dry-wet film forming process or a wet film forming process.

In the dry-wet film forming process, an aromatic polyamide/amide solvent composition is spread, the amide solvent is removed at 150° to 250° C., and then the spread film is washed with water to extract residual water-soluble compounds, thereby obtaining a wet film. Then, the wet film is subjected to drawing and heat treatment as mentioned hereinafter to finally produce the above-mentioned m-phenyleneisophthalamide polymer film.

In the production of the m-phenyleneisophthalamide polymer film by the dry-wet process, the solvent removal should be effected at a high temperature for a long period of time, since a polar high-boiling solvent such as an amide solvent is employed. The complete removal of the solvent is impossible only by a dry process, since a strong interaction occurs between the m-phenyleneisophthalamide polymer and the amide solvent to form a complex, for example. Therefore, a dry process should inevitably be combined with a wet process, thereby making the film forming process complicated.

Contrary to the above, the wet process comprises only one step and, thus, may be considered to be advantageous. However, the m-phenyleneisophthalamide polymer/amide solvent composition may not always have a good wet coagulatability and, thus, it is not easy to obtain a tough polymer film by the wet process. This problem has however been already solved as disclosed in Japanese Unexamined Patent Publication (Kokai) Nos. 56-41230 and 56-40525.

Particularly preferably, the m-phenyleneisophthalamide polymer film is prepared by a wet film forming process in which an m-phenyleneisophthalamide polymer composition consisting of an m-phenyleneisophthalamide polymer, an amide solvent, and a solubilizing agent and having a composition represented by the following formulae is introduced into an aqueous coagulating bath:

$$0.5 \geq \frac{x}{x+y} \geq 0.05 \quad \text{(IV)}$$

$$\frac{z}{x} \geq 0.1 \quad \text{(V)}$$

in which x represents the parts by weight of the m-phenyleneisophthalamide polymer, y represents the parts by weight of the amide solvent, and z represents the parts by weight of the solubilizing agent.

Still further preferably, the m-phenyleneisophthalamide polymer composition has the following composition:

$$\text{either } 0.25 \leq \frac{x}{x+y} \leq 0.336 \quad \text{(VI)}$$

$$\text{and } 0.1 \leq \frac{z}{x}$$

$$\text{or } 0.336 < \frac{x}{x+y} \leq 0.5 \quad \text{(VII)}$$

$$\text{and } 2.8 \times \frac{x}{x+y} - 0.84 < \frac{z}{x}$$

Examples of the amide solvent include tetramethylurea, hexamethylphosphoryl amide, N,N-dimethylacetamide, N-methyl-2-pyrrolidone, N-methylpiperidone, N,N-dimethylethyleneurea, N,N,N',N'-tetramethylmalonic acid amide, N-methylcaprolactam, N-acetylpyrrolidone, N,N-diethylacetamide, N-ethylpyrrolidone, N,N-dimethylpropionic acid amide, N,N-dimethylisobutylamide, N,N-dimethylpropyleneurea, and N,N-dimethylformamide as well as mixtures of two or more thereof. Preferred amide solvents are N-methyl-2-pyrrolidone, N,N-dimethylacetamide, and a mixture thereof.

Examples of the solubilizing agent include salts of metals belonging to the groups I and II of the periodic table and ammonium halide. These salts exist in the dissolved state in the polymer composition and act to enhance the stability of the solution, as described in Japanese Examined Patent Publication (Kokoku) No. 35-16027. Preferred solubilizing agents are lithium chloride, calcium chloride, and magnesium chloride, especially calcium chloride.

In the case of $$\frac{x}{x+y} < 0.05,$$

the aromatic polyamide composition may not have satisfactory film-forming properties. In the case of $$\frac{x}{x+y} > 0.5,$$

the composition may have too high a viscosity. Further, in the case of $z/x < 0.1$, the aromatic polyamide composition may not have satisfactory stability.

Typically, the m-phenyleneisophthalamide polymer composition may be prepared by a redissolving process or a solution polymerization-neutralization process.

In the redissolving process, proper proportions of an m-phenyleneisophthalamide polymer, amide solvent, and solubilizing agent are blended and dissolved together. In a typical procedure, the solubilizing agent is first dissolved into the amide solvent, and then, the polymer is admixed and dissolved into the solution, preferably while cooling. Although the solubilizing agent may not be dissolved completely in the amide solvent depending on the type or amount of the used solubilizing agent, it may often be uniformly dissolved after the addition of the polymer. Alternatively, a powder of the solubilizing agent and a powder of the polymer may be well blended together, optionally by grinding further, and thereafter, the amide solvent may be added to the blend while cooling.

The m-phenyleneisophthalamide polymer composition may also be prepared by a solution polymerization-neutralization process as disclosed, for example, in Japanese Examined Patent Publication (Kokoku) No. 35-14399.

If desirable, the following additives or modifiers may be added to the m-phenyleneisophthalamide polymer composition, for example, light stabilizers, heat stabilizers, antioxidants, crosslinking agents, flame-retardants, UV-screening agents, antistatic agents, flatting agents, colorants such as dyes and pigments, organic or inorganic fillers or reinforcements, plasticizers, and viscosity modifiers.

As the coagulating bath usable for the film formation from the m-phenyleneisophthalamide polymer composition, there may be employed an aqueous inorganic salt solution, an aqueous organic solvent solution, and a mixture thereof.

Typical examples of the inorganic salt usable for the aqueous inorganic salt solution include $CaCl_2$, $BaCl_2$, $ZnCl_2$, $MgCl_2$, NaCl, KCl, $AlCl_3$, $SnCl_2$, $NiCl_2$, $SrCl_2$, LiCl, $CaBr_2$, LiBr $Ca(NO_3)_2$, $Zn(NO_3)_2$, $Al(NO_3)_2$, $Ca(SCN)_2$, KSCN, and NaSCN. Preferred inorganic salts are LiCl, $CaCl_2$, $MgCl_2$, and $ZnCl_2$, especially LiCl and $CaCl_2$. In general, it is preferable to use an inorganic salt the same as that used as the solubilizing agent in the polymer composition.

The suitable concentration of the inorganic salt in the aqueous solution may vary depending on the type of the inorganic salt, the composition of the polymer composition, or the film-forming conditions. However, an aqueous solution containing not less than 20% by weight of an inorganic salt is generally preferred. Using such a coagulating bath, there can be obtained a film excellent in mechanical properties and transparency. Although the composition and temperature of the coagulating bath and the immersion time may vary depending on the desired thickness or transparency of the resultant film, the suitable temperature of the coagulating bath may generally be 40° to 110° C. in the case of the use of an aqueous inorganic salt solution.

As the organic solvent usable for the coagulating bath, there may be employed various alcohols as well as amide solvents. Among the alcohols, alkylene glycols are preferably used as the organic solvent. Typical alkylene glycols include ethylene glycol, propylene glycol, polyethylene glycol, and polypropylene glycol. The concentration of the aqueous polyalkylene glycol or glycerin solution may vary depending on the composition of the m-phenyleneisophthalamide polymer composition and the type and conditions of the film-forming process, but an aqueous solution of a concentration of not less than 30% by weight may generally be employed. The temperature of the coagulating bath of an aqueous organic solvent solution may be selected from temperatures of from 30° C. to the boiling point of the coagulating bath.

In a preferred embodiment of the present invention, a multi-stage coagulating bath may often employed. Although various combinations of coagulating systems such as consisting of aqueous inorganic salt solution systems of different concentrations or temperatures or systems of different compositions may be employed in the multi-stage coagulating bath, a multi-stage coagulating bath consisting of a combination of coagulating systems of the same type is preferred from the industrial view point. The film thus formed may then be washed with water to remove the organic solvent or inorganic salt, thereby producing a uniform, transparent, wet film of a water content of not less than 40% by weight, usually of 80% to 200% by weight.

The m-phenyleneisophthalamide polymer film thus formed is then to be subjected to drawing, typically by a dry drawing process or a wet drawing process. The drawing may be effected using a wet film as mentioned above or an absolute dry film resulting from the wet film. Suitably, a dry film is fed to the dry drawing process and a wet or dry film is fed to the wet drawing process. The drawing may be effected by monoaxial drawing, successive biaxial drawing, or concurrent biaxial drawing.

The dry drawing process may be carried out at a temperature of not lower than 260° C. using a roll arrangement or a tenter frame. The wet drawing process may however embrace many limitations in the controlling of temperature, drawing speed, successive draw ratio, and the like, since the m-phenyleneisophthalamide polymers have a large cohesive force and a high rate of crystallization.

Contrary to this, the wet drawing process can attain a high processability since the cohesive force of the m-phenyleneisophthalamide polymer molecule is reduced by the presence of low molecular weight components. In addition, in the wet drawing process, the drawing conditions can advantageously be set, since the drawing conditions can vary broadly by controlling the type or content of a plasticizer or low molecular weight component contained in the film.

In the wet drawing process, the m-phenyleneisophthalamide polymer film may be immersed in a solvent such as water, alcohol, alkylene glycol, or glycerin and then drawn in the solvent or in the atmosphere of the vapor of the solvent. It is preferable, to attain a high draw ratio, that the solvent contain 0.1% to 80% by weight of an amide solvent. However, if the amide solvent is contained in an amount of more than 80% by weight, the film being drawn comes to have poor mechanical properties to exhibit a plasticized flow drawing state, so that a drawn film having effective molecular orientation can not be obtained. Examples of the amide solvent include those as mentioned hereinbefore for the amide solvent to be used in the m-phenyleneisophthalamide polymer composition.

The drawing temperature is not critical, but a temperature of from 0° C. to the boiling point of the solvent may generally be preferred.

The drawing should be effected at an area draw ratio of at least 1.5, preferably at least 2.5.

After the drawing, the fact whether or not the film satisfies the relationship (II) as hereinbefore mentioned can be confirmed by washing the drawn film with water and then completely or absolutely drying the film while keeping the dimensions of the film unchanged. The degree of crystallinity of the drawn film may vary depending on the composition of the drawing bath, and thus, when the film has a density of less than 1.35 g/cm$^3$ after the washing with water and drying, the film should be heat treated.

For crystallization, the m-phenyleneisophthalamide polymer film which has been drawn may be heat treated, after absolutely drying, at a temperature of not lower than 300° C. for not less than 30 seconds, in a dry process, while keeping the dimensions of the film unchanged or keeping the film under tension.

Alternatively and preferably, the drawn m-phenyleneisophthalamide polymer film may be heat treated, in such a state that the film contains 1% to 200% by weight, preferably 3% to 150% by weight, based on the weight of the film, of an amide solvent, at a temperature of from 100° to 450° C., preferably from 100° to 360° C. under tension.

Examples of the usable amide solvent include those as mentioned hereinbefore for the amide solvent to be used in the m-phenyleneisophthalamide polymer composition. The m-phenyleneisophthalamide polymer film to be heat treated may contain, in addition to the amide solvent, another solvent such as water, an alcohol, an alkylene glycol, a halogenated hydrocarbon, or the like.

In the latter heat treatment, if the temperature is lower than 100° C., the resultant film may have a poor degree of crystallization and a poor degree of heat setting, while if the temperature is higher than 450° C., the film may have remarkably low mechanical properties.

The m-phenyleneisophthalamide polymer film according to the present invention has a moisture absorption dimensional variation at 65% R.H. of not more than 0.6% and, in addition, is excellent in mechanical properties such as Young's modulus, F-5 value, and breaking strength. Thus, the film can advantageously be utilized as a material for the production of electronic parts for large scale integration.

The present invention will further be illustrated by the following non-limitative examples. In the examples, all parts are by weight.

EXAMPLE 1

A polymer solution consisting of 20 parts of an m-phenyleneisophthalamide polymer having an intrinsic viscosity of 1.36 as measured in N-methyl-2-pyrrolidone at a concentration of 0.5% by weight, 4 parts of lithium chloride and 80 parts of N-methyl-2-pyrrolidone was spread on a glass plate by means of a doctor knife, dried at 140° C. for 20 minutes, and immersed in water to form a transparent film.

The obtained film was drawn at a draw ratio of 2.7 successively biaxially in a drawing bath consisting of a 30 wt. % aqueous N-methyl-2-pyrrolidone solution at 60° C., and then washed with water.

The biaxially oriented film was immersed into a 30 wt.% aqueous N-methyl-2-pyrrolidone solution at room temperature for 2 minutes, and water was removed by evaporation at 80° C. while keeping the dimensions of the film the same as the original ones, i.e., keeping the dimensions of the film unchanged. Thus, the aromatic polyamide film contained the good solvent in an amount of 30% by weight. The resultant film was then heat treated first at 290° C. for 20 minutes while keeping the dimensions of the film unchanged, and second at 270° C. for 10 minutes under relaxation.

The properties of the aromatic polyamide film thus obtained are as shown in Table 1 below, which proves that the resultant film is extremely excellent in mechanical properties, dimensional stability, and moisture absorption dimensional stability.

COMPARATIVE EXAMPLES 1 through 3

The procedure of example 1 was repeated, with the exception that the drawing was effected in boiling water instead of the aqueous N-methyl-2-pyrrolidone solution or the heat treatment was effected without immersing the film in the aqueous N-methyl-2-pyrrolidone solution.

The properties of the resultant films are also shown in Table 1, which clearly proves the excellent effects of the invention.

The drawing of the film in boiling water was possible only at a draw ratio of 2.1 but the successive biaxial drawing in boiling water was not possible at a draw ratio of 2.7.

TABLE 1

| Example No. | Drawing bath Draw ratio | Heat treatment First heat treatment temperature | Dimensional variation from conditioning at 65% R.H. to drying at 260° C. for 30 min. (%) | Moisture absorption deformation from complete drying at 260° C. to conditioning at 65% R.H. (%) | Breaking strength (kg/mm$^2$) | E-5 value (kg/mm$^2$) | Elongation (%) | Initial Young's modulus in tension (kg/mm$^2$) |
|---|---|---|---|---|---|---|---|---|
| 1 | NMP 30% aq 2.7 × 2.7 | Treated with NMP 30% aq 290° C. | 0.34 | 0.26 | 30 | 17 | 70 | 600 |
| Comparative | | | | | | | | |
| 1 | NMP 30% aq 2.7 × 2.7 | Not treated 350° C. | 0.58 | 0.48 | 25 | 15 | 40 | 500 |
| 2 | Boiling water 2.1 × 2.1 | Treated with NMP 30% aq 290° C. | 0.60 | 0.53 | 23 | 16 | 90 | 490 |
| 3 | Boiling water 2.1 × 2.1 | Not treated 350° C. | 1.00 | 0.80 | 18 | 13 | 80 | 400 |

Note:
NMP 30% aq refers to the 30 wt. % aqueous N—methyl-2-pyrrolidone solution.

EXAMPLES 2 through 11 and COMPARATIVE EXAMPLES 4 through 8

The procedure of example 1 was repeated, except that the drawing conditions or the heat treatment conditions were varied as shown in Table 2 below. However, in these examples, the conditions of the second heat treatment at 270° C. for 10 minutes under relaxation were not changed.

The results are also shown in Table 2.

TABLE 2

| Example No. | Drawing bath | Drawing ratio | NMP content before heat treatment (%) | First heat treatment temperature (°C.) | Dimensional variation from conditioning at 65% R.H. to drying at 260° C. for 30 min. (%) | Moisture absorption deformation from complete drying at 260° C. to conditioning at 65% R.H. (%) |
|---|---|---|---|---|---|---|
| 2 | NMP 20% aq 60° C. | 2.5 × 2.5 | 20 | 290 | 0.40 | 0.30 |
| 3 | NMP 30% aq 60° C. | 2.8 × 2.8 | 30 | " | 0.29 | 0.24 |
| 4 | NMP 30% aq 60° C. | 2.7 × 2.7 | 20 | " | 0.34 | 0.26 |
| 5 | NMP 30% aq 60° C. | " | 20 | 250 | 0.37 | 0.27 |
| 6 | NMP 30% aq 60° C. | " | 20 | 200 | 0.39 | 0.27 |
| 7 | NMP 30% aq 60° C. | " | 10 | 290 | 0.32 | 0.26 |
| 8 | NMP 30% aq 60° C. | " | 5 | 290 | 0.33 | 0.27 |

TABLE 2-continued

| Example No. | Drawing bath | Drawing ratio | NMP content before heat treatment (%) | First heat treatment temperature (°C.) | Dimensional variation from conditioning at 65% R.H. to drying at 260° C. for 30 min. (%) | Moisture absorption deformation from complete drying at 260° C. to conditioning at 65% R.H. (%) |
|---|---|---|---|---|---|---|
| 9 | NMP 10% aq 80° C. | 2.7 × 2.7 | 30 | 290 | 0.35 | 0.29 |
| 10 | NMP 30% aq 60° C. | 2.0 × 2.0 | 30 | 290 | 0.40 | 0.36 |
| 11 | NMP 30% aq 60° C. | 1.7 × 1.7 | " | " | 0.43 | 0.39 |
| Comparative | | | | | | |
| 4 | NMP 30% aq 60° C. | 1.4 × 1.4 | 30 | 290 | 0.61 | 0.55 |
| 5 | NMP 30% aq 100° C. | 2.1 × 2.1 | 30 | 290 | 0.61 | 0.51 |
| 6 | NMP 30% aq 100° C. | " | 0.5 | 300 | 0.89 | 0.75 |
| 7 | NMP 30% aq 100° C. | " | 0.1 | 350 | 0.97 | 0.81 |
| 8 | NMP 80% aq 60° C. | Drawing was impossible due to breakage | — | — | — | — |

Note:
NMP refers to N—methyl-2-pyrrolidone.

EXAMPLES 12 through 14 and COMPARATIVE EXAMPLES 9 through 11

The procedure of example 1 was repeated, with the exception that a polymer solution consisting of 20 parts of an m-phenyleneisophthalamide polymer having an intrinsic viscosity of 1.36 as measured in N-methyl-2-pyrrolidone at a concentration of 0.5% by weight, 4 parts of lithium chloride, 0.4 parts of a phenyl modified silicone oil TSF 433 (manufactured by Toshiba Silicone Co., Japan), 0.4 parts of γ-glycidoxypropyltrimethoxysilane, and 80 parts of N-methyl-2-pyrrolidone was used, and the drawing conditions and the heat treatment conditions were varied.

The properties of the resultant films are shown in Table 3, which proves the notable effects of the present invention.

EXAMPLE 15 and COMPARATIVE EXAMPLE 12

A polymer solution consisting of 6 parts of a p-phenyleneterephthalamide polymer containing 50 mol % of 3,4′-diaminodiphenyl ether units and having an intrinsic viscosity of 2.89 as measured in $H_2SO_4$ at a concentration of 0.5% by weight, 2.3 parts of calcium chloride, and 94 parts of N-methyl-2-pyrrolidone was spread on a glass plate. The film was immersed in water and drawn in a 50 wt. % aqueous N-methyl-2-pyrrolidone solution at 60° C. at a draw ratio of 1.8 successively biaxially. The film was washed with water, immersed into a 30 wt. % aqueous N-methyl-2-pyrrolidone solution for 2 minutes, and subjected to water evaporation at 80° C. The film contained 30% by weight of N-methyl-2-pyrrolidone. The film was then heat treated at 300° C. while keeping the dimensions of the film unchanged.

In comparative example 12, the film was drawn in boiling water and was not treated with the 30 wt. % aqueous N-methyl-2-pyrrolidone before the heat treatment.

TABLE 3

| Example No. | Drawing bath | Drawing ratio | NMP content before heat treatment (%) | First heat treatment temperature (°C.) | Dimensional variation from conditioning at 65% R.H. to drying at 260° C. for 30 min. (%) | Moisture absorption deformation from complete drying at 260° C. to conditioning at 65% R.H. (%) |
|---|---|---|---|---|---|---|
| 12 | 30% NMP aq 60° C. | 2.7 × 2.7 | 30 | 290 | 0.36 | 0.28 |
| 13 | 30% NMP aq 60° C. | 2.5 × 2.5 | " | " | 0.38 | 0.30 |
| 14 | 30% NMP aq 60° C. | 2.0 × 2.0 | " | " | 0.39 | 0.34 |
| Comparative | | | | | | |
| 9 | 30% NMP aq 60° C. | 2.7 × 2.7 | 0 | 350 | 0.47 | 0.42 |
| 10 | Boiling water | 2.0 × 2.0 | 30 | 290 | 0.45 | 0.40 |
| 11 | Boiling water | " | 0 | 350 | 0.81 | 0.65 |

The properties of the resultant films are shown in Table 4 below.

TABLE 4

| Example No. | Dimensional variation from conditioning at 65% R.H. to drying at 260° C. for 30 min. (%) | Moisture absorption deformation from complete drying at 260° C. to conditioning at 65% R.H. (%) | Breaking strength (kg/mm$^2$) | Breaking elongation (%) | Initial Young's modulus in tension (kg/mm$^2$) |
|---|---|---|---|---|---|
| 15 | 0.12 | 0.06 | 45 | 70 | 850 |
| Comparative 12 | 0.50 | 0.30 | 35 | 70 | 600 |

EXAMPLE 16

An aromatic polyamide composition was prepared using x parts of poly-m-phenyleneisophthalamide having an intrinsic viscosity of 1.36 as measured in N-methyl-2-pyrrolidone as an aromatic polyamide, y parts of N-methyl-2-pyrrolidone as an amide solvent, and z parts of CaCl$_2$ as a solubilizing agent. The aromatic polyamide composition had the following composition:

$$\frac{x}{x+y} = 0.33$$

$$\frac{z}{x} = 0.20$$

The composition was extruded from a T-die having a slit width of 0.25 mm and a slit length of 400 mm at 110° C. onto a casting roll in air of room temperature. Immediately thereafter, the extrudate was introduced into an aqueous solution of 43% by weight calcium chloride and 5% by weight N-methyl-2-pyrrolidone at 90° C. over a residence time of 1 minute, introduced into an aqueous solution of 44% by weight calcium chloride and 5% by weight N-methyl-2-pyrrolidone at 90° C. over a residence time of 4 minutes, washed with water at a temperature of not higher than 10° C., and then formed into wet film of a water content of 100% by weight at a rate of 2 m/min. The resultant film was drawn at a draw ratio of 2.3 successively biaxially in an aqueous solution of 30% by weight of N-methyl-2-pyrrolidone at 60° C., and washed with water. The biaxially oriented film was immersed in an aqueous solution of 30% by weight of N-methyl-2-pyrrolidone at room temperature for 2 minutes, and water was removed by evaporation at 80° C. while keeping the dimensions of the film unchanged. The resultant aromatic polyamide film containing 30% by weight of N-methyl-2-pyrrolidone was heat treated first at 290° C. for 20 minutes while keeping the dimensions of the film unchanged, and second at 270° C. for 10 minutes under relaxation.

The properties of the aromatic polyamide film thus obtained are as shown in Table 5, which proves that the film is excellent in mechanical properties, dimensional stability, and moisture absorption dimensional stability.

COMPARATIVE EXAMPLES 13 through 15

The procedure of example 16 was repeated, with the exception that the drawing was effected in boiling water or the heat treatment was effected without immersing the film in the aqueous N-methyl-2-pyrrolidone solution.

The properties of the resultant films are also shown in Table 5.

The drawing of the film in boiling water was possible only at a draw ratio of 2.1 but the successive biaxial drawing in boiling water was not possible at a draw ratio of 2.3.

TABLE 5

| Example No. | Drawing bath Draw ratio | Heat treatment First heat treatment temperature | Dimensional variation from conditioning at 65% R.H. to drying at 260° C. for 30 min. (%) | Moisture absorption deformation from complete drying at 260° C. to conditioning at 65% R.H. (%) | Breaking strength (kg/mm$^2$) | F-5 value (kg/mm$^2$) | Elongation (%) | Initial Young's modulus in tension (kg/mm$^2$) |
|---|---|---|---|---|---|---|---|---|
| 16 | NMP 30% aq 2.3 × 2.3 | Treated with NMP 30% aq 290° C. | 0.25 | 0.19 | 33 | 18 | 65 | 590 |
| Comparative | | | | | | | | |
| 13 | NMP 30% aq 2.3 × 2.3 | Not treated 350° C. | 0.40 | 0.34 | 23 | 15 | 45 | 470 |
| 14 | Boiling water 2.1 × 2.1 | Treated with NMP 30% aq 290° C. | 0.60 | 0.53 | 23 | 16 | 90 | 490 |
| 15 | Boiling water 2.1 × 2.1 | Not treated 350° C. | 1.00 | 0.83 | 18 | 13 | 80 | 400 |

EXAMPLES 17 through 27 and COMPARATIVE EXAMPLES 16 through 20

The procedures of example 16 was repeated, except that the drawing conditions or the heat treatment conditions were varied as shown in Table 6. However, in these examples, the conditions of the second heat treatment at 270° C. for 10 minutes under relaxation were not changed.

The results are also shown in Table 6.

TABLE 6

| Example No. | Drawing bath | Drawing ratio | NMP content before heat treatment (%) | First heat treatment temperature (°C.) | Dimensional variation from conditioning at 65% R.H. to drying at 260° C. for 30 min. (%) | Moisture absorption deformation from complete drying at 260° C. to conditioning at 65% R.H. (%) |
|---|---|---|---|---|---|---|
| 17 | NMP 30% aq 60° C. | 2.5 × 2.5 | 30 | 290 | 0.18 | 0.13 |
| 18 | NMP 30% aq 60° C. | 2.4 × 2.4 | " | " | 0.20 | 0.16 |
| 19 | NMP 30% aq 60° C. | 2.0 × 2.0 | " | " | 0.35 | 0.30 |
| 20 | NMP 30% aq 60° C. | 1.7 × 1.7 | " | " | 0.39 | 0.35 |
| 21 | NMP 30% aq 60° C. | 2.3 × 2.3 | 20 | 290 | 0.24 | 0.19 |
| 22 | NMP 30% aq 60° C. | " | " | 250 | 0.24 | 0.18 |
| 23 | NMP 30% aq 60° C. | " | " | 200 | 0.26 | 0.21 |
| 24 | NMP 30% aq 60° C. | " | 10 | 290 | 0.23 | 0.18 |
| 25 | NMP 30% aq 60° C. | " | 5 | " | 0.27 | 0.20 |
| 26 | NMP 20% aq 70° C. | " | 30 | " | 0.25 | 0.20 |
| 27 | NMP 10% aq 80° C. | " | " | " | 0.28 | 0.23 |
| Comparative |  |  |  |  |  |  |
| 16 | NMP 3% aq 100° C. | 2.1 × 2.1 | 30 | 290 | 0.60 | 0.50 |
| 17 | NMP 3% aq 100° C. | " | 0.5 | 300 | 0.85 | 0.75 |
| 18 | NMP 3% aq 100° C. | " | 0.1 | 350 | 0.88 | 0.78 |
| 19 | NMP 30% aq 60° C. | 1.4 × 1.4 | 30 | 290 | 0.60 | 0.53 |
| 20 | NMP 80% aq 60° C. | Drawing was impossible due to breakage | — | — | — | — |
| Informative | Aromatic polyimide film made from trimellitic acid anhydride and 4,4'-diaminodiphenyl ether |  |  |  | 0.30 | 0.21 |

EXAMPLES 28 through 31 and COMPARATIVE EXAMPLES 21 through 23

The procedure of example 16 was repeated, with the exception that the poly-m-phenyleneisophthalamide contained 2% by weight of glycidoxypropyltrimethoxysilane, and the drawing conditions or the heat treatment conditions were varied.

The properties of the resultant films are shown in Table 7 below.

EXAMPLES 32 through 36

A polymer composition was prepared using x parts of poly-m-phenyleneisophthalamide, y parts of N-methyl-2-pyrrolidone, and z parts of calcium chloride. The polymer composition had the following composition:

$$\frac{x}{x+y} = 0.33$$

TABLE 7

| Example No. | Drawing bath | Drawing ratio | NMP content before heat treatment (%) | First heat treatment temperature (°C.) | Dimensional variation from conditioning at 65% R.H. to drying at 260° C. for 30 min. (%) | Moisture absorption deformation from complete drying at 260° C. to conditioning at 65% R.H. (%) |
|---|---|---|---|---|---|---|
| 28 | 30% NMP aq 60° C. | 2.5 × 2.5 | 20 | 290 | 0.17 | 0.13 |
| 29 | 30% NMP aq 60° C. | 2.4 × 2.4 | " | " | 0.20 | 0.18 |
| 30 | 30% NMP aq 60° C. | 2.3 × 2.3 | " | " | 0.24 | 0.20 |
| 31 | 30% NMP aq 60° C. | 2.1 × 2.1 | " | " | 0.33 | 0.28 |
| Comparative |  |  |  |  |  |  |
| 21 | 30% NMP aq 60° C. | 2.3 × 2.3 | 0 | 350 | 0.40 | 0.34 |
| 22 | Boiling water | 2.1 × 2.1 | 20 | 290 | 0.55 | 0.50 |
| 23 | Boiling water | " | 0 | 350 | 0.85 | 0.75 |

$$\frac{z}{x} = 0.20$$

-continued

The properties of the resultant films are shown in Table 9. It was proved from the results that these films have a significantly high moisture absorption dimensional variation.

TABLE 8

| Example No. | Heat treatment temperature (°C.) | d (gcm$^{-3}$) | $\frac{n_\alpha + n_\beta}{2} - n_\gamma$ | Equilibrium moisture content at 65% R.H. (%) | Moisture absorption dimensional variation at 65% R.H. (%) | Young's modulus (Kg$_{mm}$$^{-2}$) | F-5 value (Kg$_{mm}$$^{-2}$) | Strength (Kg$_{mm}$$^{-2}$) | Elongation (%) |
|---|---|---|---|---|---|---|---|---|---|
| 32 | 230 | 1.362 | 0.075 | 3.6 | 0.60 | 482 | 15.0 | 23.3 | 97 |
| 33 | 250 | 1.366 | 0.074 | 3.5 | 0.45 | 465 | 15.3 | 21.7 | 96 |
| 34 | 270 | 1.374 | 0.080 | 3.8 | 0.47 | 487 | 16.2 | 23.0 | 89 |
| 35 | 290 | 1.381 | 0.079 | 3.6 | 0.46 | 493 | 16.2 | 23.0 | 89 |
| 36 | 310 | 1.381 | 0.079 | 4.0 | 0.56 | 480 | 16.0 | 22.8 | 80 |

TABLE 9

| Example No. | Area draw ratio | Heat treatment temperature (°C.) | d (gcm$^{-3}$) | $\frac{n_\alpha + n_\beta}{2} - n_\gamma$ | Equilibrium moisture content at 65% R.H. (%) | Moisture absorption dimensional variation at 65% R.H. (%) | Young's modulus (Kg$_{mm}$$^{-2}$) | F-5 value (Kg$_{mm}$$^{-2}$) | Strength (Kg$_{mm}$$^{-2}$) | Elongation (%) |
|---|---|---|---|---|---|---|---|---|---|---|
| Comparative |  |  |  |  |  |  |  |  |  |  |
| 24 | 1.3 | 250 | 1.332 | 0.038 | 8.2 | 1.21 | 290 | 10.5 | 17.3 | 90 |
| 25 | 1.3 | 350 | 1.378 | 0.041 | 4.5 | 0.91 | 300 | 9.1 | 12.5 | 50 |
| 26 | 2.9 | 290 | 1.342 | 0.051 | 6.5 | 0.89 | 330 | 10.5 | 19.2 | 121 |
| 27 | 3.6 | 270 | 1.335 | 0.067 | 6.3 | 0.91 | 343 | 11.3 | 19.8 | 120 |
| 28 | 3.6 | 290 | 1.335 | 0.065 | 5.8 | 0.83 | 351 | 11.0 | 19.0 | 103 |

The composition was extruded, by means of an extruder of a diameter of 30 mm, from a T-die having a slit width of 0.1 mm and a slit length of 400 mm at 110° C. onto a casting roll. The extrudate was introduced into an aqueous solution of 43% by weight calcium chloride at 100° C., and then washed with water at a temperature below 10° C. to obtain an undrawn wet film. The undrawn wet film was then drawn in hot water of 95° C. successively biaxially at a draw ratio of 1.9 in the machine direction and at a draw ratio of 1.9 in the transverse direction.

The wet biaxially oriented film was immersed in an aqueous solution of 30% by weight N-methyl-2-pyrrolidone at room temperature for 10 minutes, and dried in a hot air dryer at 60° C. for 10 minutes while keeping the dimensions of the film unchanged. Thus, a film containing 20% by weight of N-methyl-2-pyrrolidone was obtained. Then, the film was heat treated at a temperature of from 230° C. to 310° C.

The properties of the resultant films are shown in Table 8.

The films had excellent moisture absorption dimensional stability and mechanical properties, even as compared with the films of comparative examples 24 through 28 hereinbelow mentioned, which proves that the film according to the present invention has excellent performance.

COMPARATIVE EXAMPLES 24 through 28

An undrawn wet film prepared as mentioned in examples 32 through 36 above was drawn in hot water of 95° C. successively biaxially at an area draw ratio of from 1.3 to 3.6, dried in a hot air dryer at 120° C. for 10 minutes without immersing it in an aqueous N-methyl-2-pyrrolidone solution, and then heat treated at a temperature of from 250° C. to 350° C.

EXAMPLES 37 through 41

The procedure of examples 32 through 36 was repeated, except that the undrawn wet film was drawn in an aqueous solution containing 30% by weight of N-methyl-2-pyrrolidone successively biaxially at an area draw ratio as shown in Table 10. The results are also shown in the table.

The $$\frac{n_\alpha + n_\beta}{2} - n_\gamma$$

value increases linearly as the increase of the area draw ratio, which proves that there is an improvement in the biaxial molecular orientation of the films. According to the improvement in the biaxial molecular orientation of the films, the films have a low moisture absorption dimensional variation and a significantly improved Young's modulus, F-5 value and tensile strength. Thus, it was clearly proved that the film according to the present invention has a high performance resulting from the improvement in the biaxial molecular orientation.

EXAMPLES 42 and 43

The procedure of examples 37 through 41 was repeated, except that the successive drawing was carried out at the respective draw ratios in the machine direction (MD) and transverse direction (TD) as shown in Table 11.

The results are also shown in the table.

As is seen from the table, the ($n_\alpha - n_\beta$) values of the resultant films are both lower than 0.08 and the films have a lower area anisotropy in the moisture absorption dimensional variation at 65% R.H., as compared with that in comparative example 29 as mentioned below.

The area anisotropy in the moisture absorption dimensional variation at 65% R.H. refers to the difference between the maximum value and the minimum value in the moisture absorption dimensional variation at 65% R.H. as measured in the all directions in the film area.

COMPARATIVE EXAMPLE 29

The procedure as in example 32 through 36 was repeated, except that the drawing was carried out at a draw ratio of 2.5 only in the machine direction (MD). The results are also shown in Table 11.

TABLE 10

| Example No. | Area draw ratio | Heat treatment temperature (°C.) | d (gcm$^3$) | $\frac{n_\alpha + n_\beta}{2} - n_\gamma$ | Equilibrium moisture content at 65% R.H. (%) | Moisture absorption dimensional variation at 65% R.H. (%) | Young's modulus (Kg$_{mm}{}^{-2}$) | F-5 value (Kg$_{mm}{}^{-2}$) | Strength (Kg$_{mm}{}^{-2}$) | Elongation (%) |
|---|---|---|---|---|---|---|---|---|---|---|
| 37 | 3.6 | 290 | 1.379 | 0.090 | 3.1 | 0.40 | 500 | 16.0 | 24.7 | 80 |
| 38 | 4.8 | 290 | 1.380 | 0.109 | 3.1 | 0.33 | 510 | 16.5 | 25.0 | 61 |
| 39 | 6.0 | 290 | 1.379 | 0.118 | 3.0 | 0.26 | 545 | 17.2 | 29.4 | 68 |
| 40 | 6.5 | 290 | 1.378 | 0.131 | 2.8 | 0.23 | 570 | 18.7 | 34.2 | 53 |
| 41 | 7.3 | 290 | 1.378 | 0.140 | 2.5 | 0.19 | 620 | 21.6 | 36.9 | 51 |

TABLE 11

| Example No. | Heat treatment temperature (°C.) | Draw ratio MD | Draw ratio TD | d (gcm$^{-3}$) | $n_\alpha - n_\beta$ | $\frac{n_\alpha + n_\beta}{2} - n_\gamma$ | Area anisotropy in moisture absorption dimensional variation at 65% R.H. (%) |
|---|---|---|---|---|---|---|---|
| 42 | 290 | 2.5 | 2.5 | 1.381 | 0.004 | 0.118 | 0.01 |
| 43 | 290 | 2.5 | 1.7 | 1.379 | 0.050 | 0.100 | 0.06 |
| Comparative 29 | 290 | 2.5 | 1.0 | 1.381 | 0.090 | 0.080 | 0.33 |

We claim:

1. An m-phenyleneisophthalamide polymer film having a density d of from 1.35 to 1.41 g/cm$^3$ and principal refractive indices $n_\alpha$, $n_\beta$ and $n_\gamma$ $_{(n\alpha > n\beta > n\gamma)}$ for D-line of a wavelength of 589 nm satisfying the following formula:

$$\frac{n_\alpha + n_\beta}{2} - n_\gamma \geq 0.05.$$

2. A film as claimed in claim 1, wherein the m-phenyleneisophthal-amide polymer contains at least 95 mol % of m-phenyleneisophthalamide units.

3. A film as claimed in claim 2, wherein the m-phenyleneisophthalamide polymer contains copolymerized units derived from an amine component selected from the group consisting of p-phenylenediamine, benzidine, 4,4'-diaminodiphenyl ether, 3,4'-diaminodiphenyl ether, xylenediamine, toluenediamine, and 4,4'-diaminodiphenylsulfone.

4. A film as claimed in claim 2, wherein the m-phenyleneisophthalamide polymer contains copolymerized units derived from an acid component selected from the group consisting of terephthaloyl chloride, 1,4'naphthalenedicarboxylic acid chloride, 2,6-naphthalenedicarboxylic acid chloride, diphenylsulfone-4,4'-dicarboxylic acid chloride, and 4,4'-diphenyldicarboxylic acid chloride.

5. A film as claimed in claim 1, wherein the principal refractive indices of the film further satisfy the relationship, $$n_\alpha - n_\beta \geq 0.08.$$

* * * * *

UNITED STATES PATENT AND TRADEMARK OFFICE
CERTIFICATE OF CORRECTION

PATENT NO. : 4,539,393
DATED : September 3, 1985
INVENTOR(S) : Y. Tamura et al.

It is certified that error appears in the above-identified patent and that said Letters Patent is hereby corrected as shown below:

Column 1, line 58, change "unsatisfactorily" to --unsatisfactory--.

Column 1, line 67, change "dimensional, of" to --dimensional stability of--.

Column 2, line 29, change "na, nB, and na" to --na, nB, and ny--.

Column 4, line 55, between the words "out" and "one", add the word --in--.

Column 5, line 1, change "direction" to --directions--.

Column 5, line 27, change "N,N-dimethyl-acetamide" to --N,N-dimethylacetamide--.

Column 9, line 3, change "(na>ny>ny) to --(na>nB>ny)--.

Column 9, lines 50-51, change "{at 25°C. 65% R.H. Dimensions of film conditioned}" to --{Dimensions of film conditioned at 25°C., 65% R.H.}--

UNITED STATES PATENT AND TRADEMARK OFFICE
CERTIFICATE OF CORRECTION

PATENT NO. : 4,539,393
DATED : September 3, 1985
INVENTOR(S) : Y. Tamura et al.

It is certified that error appears in the above-identified patent and that said Letters Patent is hereby corrected as shown below:

Column 10, line 51, change "in the all" to -- in all--.

Column 13, line 28, between "often" and "employed", add the word --be--.

Column 13, line 30, between "such" and "as" add the word --those--.

Column 19, line 64, change "N-methyl-2-pyrr-" to ---N-methyl-2-pyrro---.

Column 20, line 62, change "was" to --were--.

Column 21, Table 6, change "Aromatic polyimide" to --Aromatic polyamide--.

Column 25, line 40, change "$(n_a \rangle Nb \rangle Ny)$" to --$(Na_\gamma Nb_\gamma Ny)$--.

UNITED STATES PATENT AND TRADEMARK OFFICE
CERTIFICATE OF CORRECTION

PATENT NO. : 4,539,393

DATED : September 3, 1985

INVENTOR(S) : Y. Tamura et al.

It is certified that error appears in the above-identified patent and that said Letters Patent is hereby corrected as shown below:

Column 26, line 2, omit the hyphen between "phenyleneisophtol" and "amide".

Signed and Sealed this

Eleventh Day of February 1986

[SEAL]

Attest:

Attesting Officer

DONALD J. QUIGG

Commissioner of Patents and Trademarks

UNITED STATES PATENT AND TRADEMARK OFFICE
CERTIFICATE OF CORRECTION

PATENT NO. : 4,539,393

DATED : September 3, 1985

INVENTOR(S) : Y. Tamura et al.

It is certified that error appears in the above-identified patent and that said Letters Patent is hereby corrected as shown below:

Column 9, line 6, change "$N_B$" to --$n_B$--.

Signed and Sealed this

Fourth Day of November, 1986

[SEAL]

Attest:

DONALD J. QUIGG

*Attesting Officer*    *Commissioner of Patents and Trademarks*

UNITED STATES PATENT AND TRADEMARK OFFICE
CERTIFICATE OF CORRECTION

PATENT NO. : 4,539,393

DATED : September 3, 1985

INVENTOR(S) : Y. Tamura et al.

It is certified that error appears in the above-identified patent and that said Letters Patent is hereby corrected as shown below:

Column 26, line 45 (claim 5, line 4), please change "$n_a - n_B \geq 0.08$" to --$n_a n_B \leq 0.08$--.

Signed and Sealed this

First Day of December, 1987

Attest:

DONALD J. QUIGG

*Attesting Officer*   *Commissioner of Patents and Trademarks*